March 29, 1966     J. E. BORAH     3,242,532
MOLD LOADING APPARATUS

Filed Aug. 6, 1962     4 Sheets-Sheet 1

INVENTOR.
JOHN E. BORAH
BY *Hobbs & Caston*
ATTORNEYS

March 29, 1966 J. E. BORAH 3,242,532
MOLD LOADING APPARATUS
Filed Aug. 6, 1962 4 Sheets-Sheet 3

INVENTOR.
JOHN E. BORAH
BY Hobbs & Easton
ATTORNEYS

March 29, 1966    J. E. BORAH    3,242,532
MOLD LOADING APPARATUS
Filed Aug. 6, 1962    4 Sheets-Sheet 4

INVENTOR.
JOHN E. BORAH
BY Hobbs & Caston
ATTORNEYS

United States Patent Office 3,242,532
Patented Mar. 29, 1966

3,242,532
MOLD LOADING APPARATUS
John E. Borah, 815 Mishawaka Ave., Mishawaka, Ind.
Filed Aug. 6, 1962, Ser. No. 215,071
4 Claims. (Cl. 18—16)

The present invention relates to a mold loading apparatus and more particularly to an apparatus for loading a multiple cavity mold for producing articles of rubber and rubber-like material.

In the production of small and medium-sized articles of rubbed and rubber-like material, molds are often used, consisting of a top and bottom mold section with or without one or more intermediate sections and containing a relatively large number of mold cavities which must be loaded individually with separate inserts and/or slugs of uncured rubber or other moldable material. These cavities must be loaded each time after the molded articles have been removed from the mold while the press is idle and, if there are any substantial number of cavities, the press may remain inoperable for relatively long periods of time between the molding operations. Further, if the mold is a two section type, the upper and lower sections are secured to the upper and lower platens and hence remain in the press during loading and unloading operations, the loading operation is not only inconvenient and time consuming, but may be hazardous to the press operator. It is therefore one of the principal objects of the present invention to provide a relatively simple, easily operated mold loading apparatus which can be prepared for the mold loading operation while the press is performing the molding operation and which can be operated quickly, safely and reliably to load the mold immediately after the molded articles have been ejected from the mold and while the mold is still hot from the preceding molding operation.

Another object of the present invention is to provide a mold loading apparatus which can easily be prepared for the loading operation while the press operator is waiting for the molding operation to be completed, and which can automatically be placed in the proper mold loading position while the press is open and the section containing the cavities is either positioned in the press or withdrawn therefrom.

In some molding operations, an insert, such as a metal ring, sleeve or collar, must be inserted in the mold cavity during the mold loading operation, along with the moldable rubber material. These inserts are often coated or otherwise treated with a material for producing an effective bond between the insert and the rubber. This coating material, however, is neutralized by the skin oils and foreign greases from the hands of the press operator if the inserts are placed in the mold cavities by the bare hands of the operator. In an effort to load the hot molds quickly by the conventional method, the operator often carelessly touches the coated or treated inserts with his bare hands, thus producing a defective bond between the insert and the rubber and resulting in rejection and scrapping of the completed article. It is therefore another object of the invention to provide an apparatus for loading the mold with both the inserts and the moldable rubber in successive order with a minimum amount of time being required to complete the loading operation and with very little special care being required to properly place the inserts and movable material in the mold cavities.

A further object of the invention is to provide an apparatus for loading both inserts and moldable material, which can be prepared for the loading operation while the press is performing its molding operation, and which can readily be operated with a manimum amount of time and effort to load a hot mold either positioned in or withdrawn from the press.

Still another object of the invention is to provide a mold loading apparatus of the aforesaid type which is mounted on the press, and which travels with the section of the mold to be loaded thereby.

Additional objects and advantages of the present invention will become apparent from the following description and accompanying drawings, wherein:

FIGURE 5 is an enlarged partial cross sectional view through a portion of the present mold loading apparatus, the section being taken on line 5—5 of FIGURE 2;

FIGURE 6 is an enlarged fragmentary cross sectional view of the mold loading apparatus, the section being taken on line 6—6 of FIGURE 2.

Figure 1:
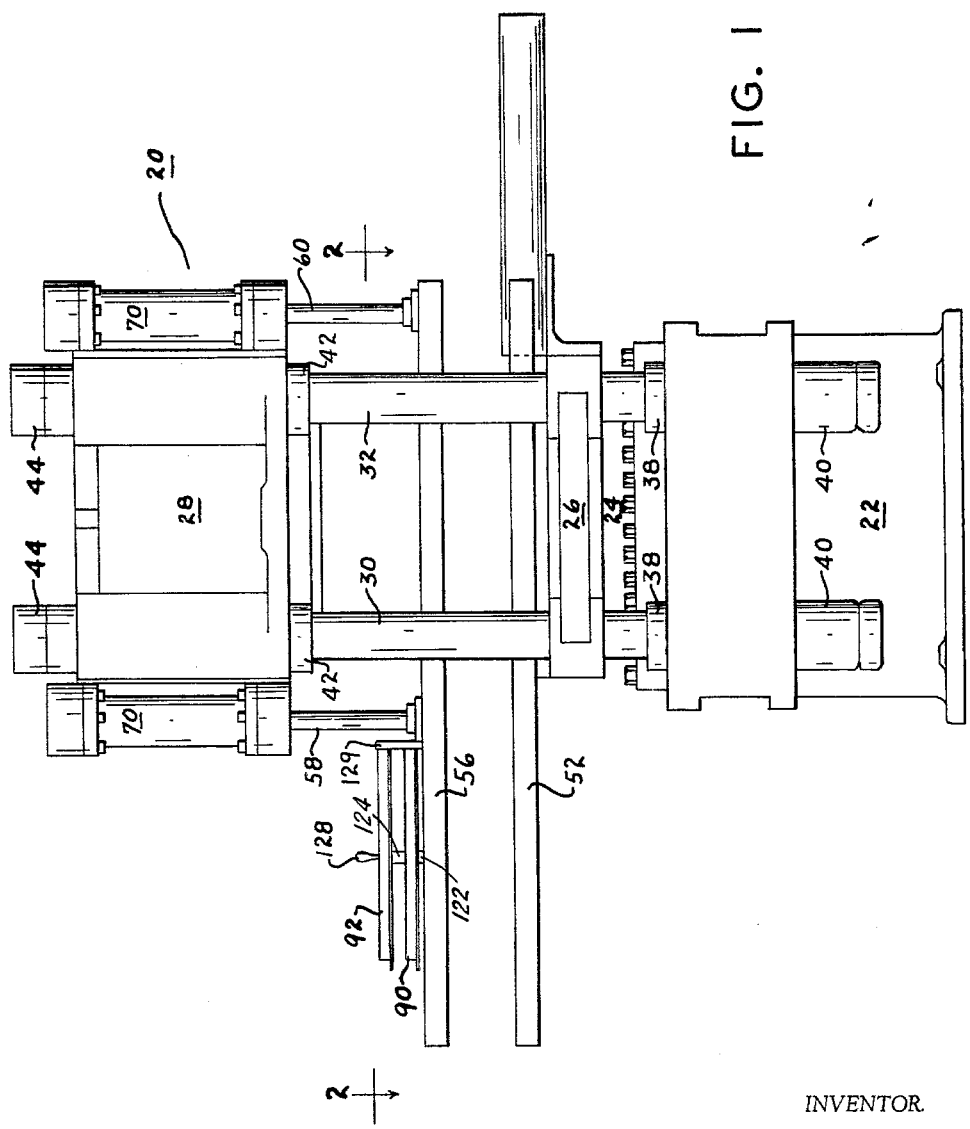
FIGURE 1 is a side elevational view of a conventional hydraulic press having mounted thereon a mold operating mechanism and the present mold loading apparatus, the press and mechanism being shown in their fully opened positions.
Figure 2:
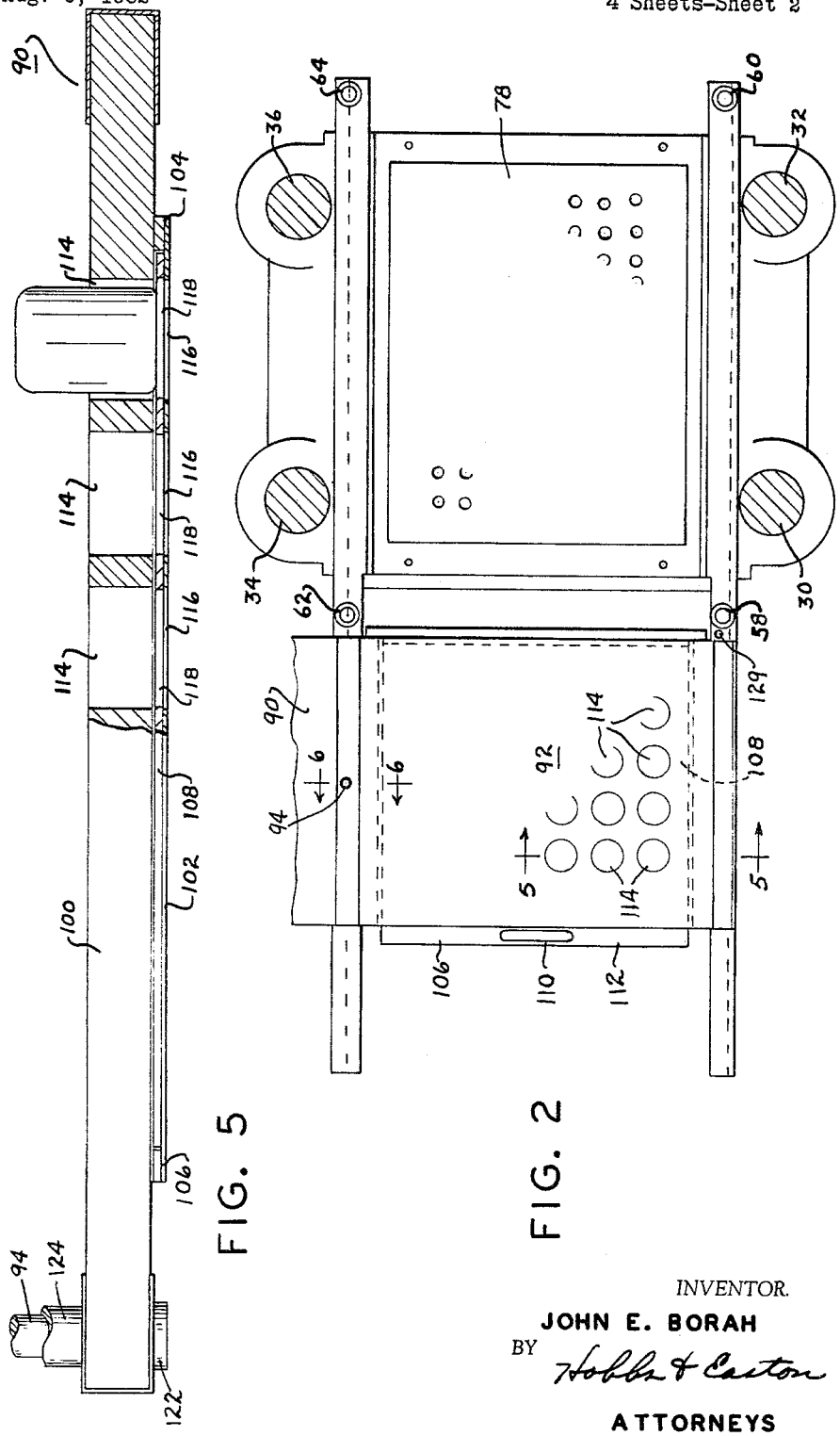
FIGURE 2 is a horizontal cross sectional view of the press, the section being taken on line 2—2 of FIGURE 1, showing the top plan view of the present mold loading apparatus.
Figure 3:
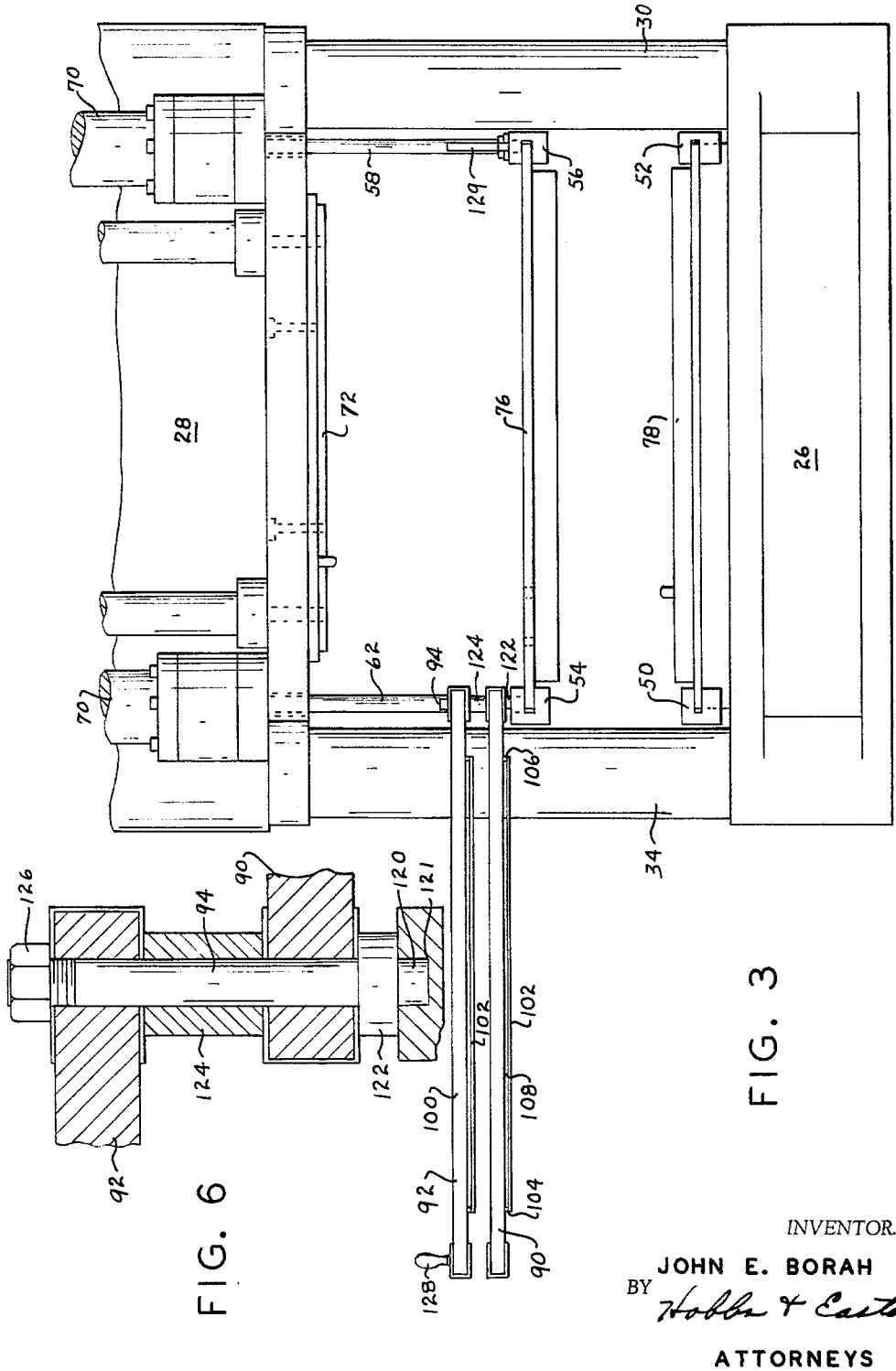
FIGURE 3 is a fragmentary elevational view of the press shown in FIGURES 1 and 2 and a side elevational view of the present mold loading apparatus, showing said apparatus in its inoperable position.
Figure 4:
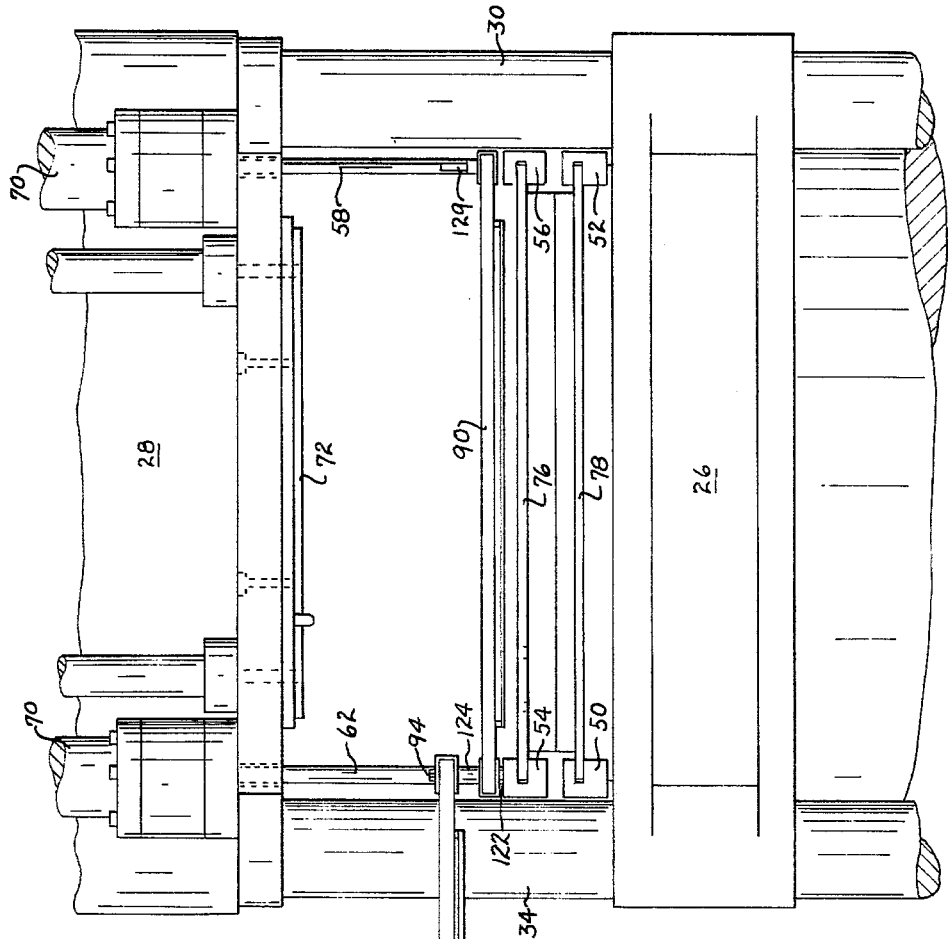
FIGURE 4 is a fragmentary view of the press similar to that shown in FIGURE 3 and an elevational view of the present mold loading apparatus, illustrating the manner in which the present apparatus is operated.

Referring more specifically to the drawings, numeral 20 designates generally a hydraulic press including a base 22 containing the hydraulic cylinder with a ram 24, ram platen 26, press head 28 and four corner posts or tie rods 30, 32, 34 and 36 extending through the enlarged upper end of base 22 and head 28 and being rigidly secured to the base and head by collars 38 and jam nuts 40 at the base and collars 42 and jam nuts 44 at the head. Ram platen 26 is secured to the upper end of ram 24 and is provided at the corners with bosses journalled on the tie rods. The press shown in the drawings is considered for the purpose of the present description as a conventional hydraulic press controlled and operated by well known hydraulic equipment, including a supply tank, electrical driven pressure pump, and standard control valves and relays (not shown). This type of press and the details in construction shown are included to fully illustrate the operation of the present mold loading apparatus in combination with a mold opening and handling mechanism of the type illustrated in my U.S. Patent No. 2,983,953. The mold opening and handling mechanism briefly includes lower tracks 50 and 52 and intermediate tracks 54 and 56, tracks 50 and 52 being secured to the ram platen and movable therewith, and tracks 54 and 56 being supported, controlled and operated by rods 58, 60, 62 and 64, respectively, and hydraulic cylinders 70.

The foregoing mold opening and handling apparatus is designed for both compression and transfer molds, the one shown being a three part compression mold having an upper section 72 secured to the head platen, an intermediate mold section 76 suspended on tracks 54 and 56, and lower mold section 78, resting on the ram platen and supported by tracks 50 and 52 when the section is withdrawn from the press for loading. When a two part compression mold is used, the lower section may be supported solely by the ram platen or by the ram platen and tracks 50 and 52 or tracks 54 and 56. Regardless of the type of mold, the present mold loading apparatus operates in the same manner to load the mold cavities with inserts and slugs of moldable material. In the mold shown, the cavities in intermediate section 76 are loaded with both the insert and slugs of moldable material.

The present mold loading apparatus illustrated in FIGURES 1 through 4 is a multiple type consisting of a loader unit for inserts and a loader unit for the moldable material. In the apparatus shown, the lower unit 90 is normally used for the inserts and the upper unit 92 for slugs of moldable material, and both units are pivoted at the center of one end on a vertical pin or shaft 94 and are adapted to swing from the laterally extending position shown in FIGURE 3 to the mold loading position shown in FIGURE 4. The two units 90 and 92 are substantially identical to one another, each consisting of a plate-like body 100 and a plate 102 secured to and spaced from the underside of body 100 and connected thereto by side members 104 and 106, at opposite ends of the plate. A slidable panel 108 is inserted in the space between body 100 and plate 102 and is moved into and out of loading position by hand portion 110 in an extended edge 112 of the panel. Body 100 and plate 102 contain aligned holes 114 and 116 corresponding in number to the number of cavities in the section of the mold being filled with the inserts and moldable material. The size and shape of the holes depend upon the size and shape of the cavities in the mold and/or upon the shape of the insert and size of slug being loaded into the cavities. Slidable panel 108 contains the same number of holes 118 as body 100 and plate 102 with the corresponding spacings between the holes, and, in one position of panel 108, the space between the holes in the panel is interposed between the corresponding holes in the body and plate, and in another position of the panel, the holes therein are aligned with the holes in the body and plate. The panel can be readily shifted from the position in which the holes are not aligned into the position in which the holes are aligned by shifting the panel inwardly and outwardly, using hand portion 110.

In the embodiment of the invention illustrated in the drawings, units 90 and 92 are pivotally mounted on rail 54 by a pivot means consisting of bolt 94 having an extension 120 extending into hole 121 in the upper surface of track 54 and a collar 122 seating on the upper surface of the track and giving support to unit 90. A spacer 124 supports unit 92 on bolt 94, and a nut 126 on the upper end of bolt 94 retains the two units together as a single apparatus. The assembled units and pivot means can be lifted bodily from the track 54 by merely lifting extension 120 from hole 121. The two units are adapted to rotate independently of one another from the position shown in FIGURE 3 to the position shown in FIGURE 4, and a handle 128 may be provided on one or both of the units to assist in pivoting them between the two positions.

In the operation of the present mold loading apparatus, panels 108 in the two units are moved to the position where the spaces between the holes therein are interposed between the corresponding holes in body 100 and plate 102, thus providing a support for the inserts and slugs of moldable material. With the press and mold sections in the position shown in FIGURE 4, i.e. with the lower and intermediate mold sections together but removed from the press on the respective tracks, unit 90 is swung from the position shown in FIGURE 3 to the position shown in FIGURE 4, with the unit directly above mold section 76 and against stop stud 129, and with the holes in body 100 and plate 102 directly above and in alignment with the cavities in section 76. While the unit is in this position, the operator pulls panel 108 outwardly until the holes in the panel are in substantial alignment with the corresponding holes in body 100 and plate 102, thus permitting the inserts in the holes in body 100 to drop downwardly through the holes in panel 108 and plate 102 into the mold cavities. The panel is then returned to its original position and the unit swung to its laterally extending position shown in FIGURE 3. Unit 92 containing the slugs of moldable material is then moved into position over mold section 76, and the panel 108 moved until the holes therein are in substantial alignment with the holes in the body and plate, thus permitting the slugs of moldable material to drop into the mold cavities when panel 108 thereof is operated. The panel is then returned to its original position and the unit 92 to its laterally extended position. Thereafter, the mold section 76 is returned to the press and the press closed for the next succeeding mold operation. While the mold is in the press, the operator swings unit 92 inwardly, exposing the upper surface of unit 90 so that the inserts can be placed in the holes in the body. The unit 92 is then returned to its lateral position and the slugs of moldable material are placed in the holes in body 100 of the upper unit, thus preparing the mold loading apparatus for the next succeeding mold loading operation.

Figure 7:
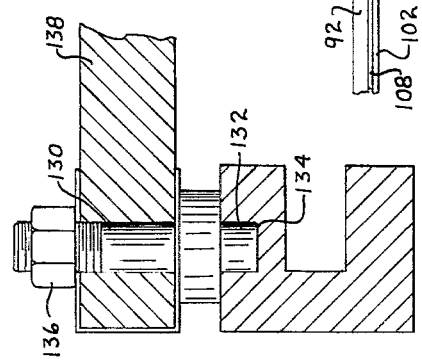
FIGURE 7 is an enlarged fragmentary cross sectional view of a modified form of the mold loading apparatus, the section being taken on a line similar to that of FIGURE 6.

If desired, only one of the two units 90 or 92 may be used when the molded articles are not provided with inserts. The operation of one of the units is the same as that previously described. FIGURE 7 illustrates a modified form in which the unit, while identical to those shown in the preceding figures, uses a modified pivot means consisting of a bolt 130 having extension 132 for seating in hole 134 in the upper surface of track 54 and a nut 136 for retaining the unit 138 on bolt 130 in assembled position. The unit, together with the pivot means, can be lifted bodily from the track by merely lifting extension 132 from hole 134. Two individual units 138, one on each track 54 and 56, may be used if desired, for inserts and slugs of moldable material.

While the present mold loading apparatus is shown in conjunction with a mold opening and handling mechanism, the present apparatus can be used satisfactorily in conjunction with conventional or standard mold operating devices in which the mold section containing the cavities either remains in the press or is removed therefrom onto a table where the present apparatus is used to load the cavities. A suitable support, either on the press or on the table for pivotally supporting units 90 and/or 92, is used to swing the units from their laterally extending load receiving position to their mold loading position over the mold sections.

Although only one embodiment of the present invention with one modification thereof has been described in detail herein, various changes and further modifications may be made to satisfy requirements without departing from the scope of the invention.

I claim:

1. A mold loading apparatus for a press having two vertically movable horizontal tracks and for a mold having a multiple cavity section supported by said tracks and movable from the press along said tracks, comprising two relatively shallow plate-like bodies disposed horizontally and arranged one above the other in spaced relation for moldable slugs and inserts, each of said bodies having holes therethrough corresponding to the cavities in said section, a plate secured to the underside of said body and spaced therefrom and having holes therethrough corresponding to the holes in said body, a panel slidably disposed between said body and plate and having holes therein corresponding to the holes in said body and plate, means for moving said panel to and from a discharge position in which the holes in the body, plate and panel are in substantial alignment, and support means at one end of said bodies for independently pivoting said bodies on one of said tracks for movement from a position between and above said tracks to a position extending laterally therefrom.

2. A mold loading apparatus for a press having two vertically movable horizontal tracks and for a mold having a multiple cavity section supported by said tracks and movable from the press along said tracks, comprising two plate-like bodies disposed horizontally and arranged one above the other in spaced relation for moldable slugs and inserts, each of said bodies having holes therethrough corresponding to the cavities in said section, releasable means beneath said holes for retaining said slugs and inserts in said holes, and a support means for independently pivoting said bodies on one of said tracks for movement from a position between and above said tracks to a position extending laterally therefrom.

3. A mold loading apparatus for a press having two vertically movable horizontal tracks and for a mold having a multiple cavity section supported by said tracks and movable from the press along said tracks, comprising a plate-like body disposed horizontally and having holes therethrough corresponding to the cavities in said section, a plate secured to the underside of said body and spaced therefrom and having holes therethrough corresponding to the holes in said body, a panel slidably disposed between said body and plate and having holes therein corresponding to the holes in said body and plate, means for moving said panel to and from a discharge position in which the holes in the body, plate and panel are in substantial alignment, and support means at one end of said body for pivotally mounting said body on one of said tracks for moving said body from a load receiving position to a load discharging position.

4. A mold loading apparatus for a press having two vertically movable horizontal tracks and for a mold having a multiple cavity section supported by said tracks and movable from the press along said tracks, comprising a plate-like body disposed horizontally and having holes therethrough corresponding to the cavities in said section for mold loading material, releasable means beneath said holes for retaining said material in said holes, and support means at one end of said body for pivotally mounting said body on one of said tracks for moving said body from a load receiving position to a load discharging position.

References Cited by the Examiner

UNITED STATES PATENTS

| | | | |
|---|---|---|---|
| 767,872 | 8/1904 | Davies | 18—16 |
| 2,394,260 | 2/1946 | Pfeilsticker | 18—16 X |
| 2,954,584 | 10/1960 | Groves | 18—16 |
| 2,983,953 | 5/1961 | Borah | 18—16 |

J. SPENCER OVERHOLSER, *Primary Examiner.*

ROBERT F. WHITE, WILLIAM J. STEPHENSON,
*Examiners.*